(12) United States Patent
Kadosh

(10) Patent No.: US 7,770,325 B2
(45) Date of Patent: Aug. 10, 2010

(54) METHOD FOR PLANTING AND TRANSPORTING PRE-GROWN HEDGES TO PROVIDE AN INSTANT FENCE

(76) Inventor: Yoav Kadosh, 38 David Pinsky Street, Haifa (IL)

(*) Notice: Subject to any disclaimer, the term of this patent is extended or adjusted under 35 U.S.C. 154(b) by 106 days.

(21) Appl. No.: 12/160,213

(22) PCT Filed: Jan. 9, 2007

(86) PCT No.: PCT/IL2007/000033
§ 371 (c)(1), (2), (4) Date: Nov. 10, 2008

(87) PCT Pub. No.: WO2007/080582
PCT Pub. Date: Jul. 19, 2007

(65) Prior Publication Data
US 2009/0077880 A1 Mar. 26, 2009

(30) Foreign Application Priority Data
Jan. 9, 2006 (IL) .......................... 173026

(51) Int. Cl.
*A01G 9/02* (2006.01)
(52) U.S. Cl. .......................... 47/66.7; 47/73
(58) Field of Classification Search .......... 47/4, 47/66.7, 73, 62 C
See application file for complete search history.

(56) References Cited

U.S. PATENT DOCUMENTS

| | | | | |
|---|---|---|---|---|
| 944,522 A * | 12/1909 | Taylor | ............................ | 47/73 |
| 1,634,727 A * | 7/1927 | Ormiston | ....................... | 47/73 |
| 1,665,124 A * | 4/1928 | Wright | ........................... | 47/73 |
| 3,301,452 A * | 1/1967 | Jester | ..................... | 229/117.23 |
| 3,645,041 A * | 2/1972 | Addin | ...................... | 47/58.1 R |
| 4,250,663 A * | 2/1981 | Merritt | ......................... | 47/73 |
| 4,392,327 A * | 7/1983 | Sanders | ...................... | 47/59 R |
| 5,232,258 A * | 8/1993 | Rossi | .......................... | 294/152 |
| 5,279,070 A * | 1/1994 | Shreckhise et al. | ............ | 47/39 |
| 5,921,020 A * | 7/1999 | Avidan | ............................. | 47/4 |
| 5,943,831 A * | 8/1999 | Pangburn | ..................... | 52/155 |
| 5,953,859 A * | 9/1999 | Cochran et al. | .............. | 47/66.5 |
| 5,966,870 A * | 10/1999 | Michailiuk | ..................... | 47/73 |
| 5,996,280 A * | 12/1999 | Michailiuk | ..................... | 47/86 |
| 6,615,540 B1* | 9/2003 | Muller | .......................... | 47/68 |
| 6,865,845 B2* | 3/2005 | Fraleigh | ................ | 47/58.1 SE |
| 7,306,402 B2* | 12/2007 | Graber et al. | ............... | 405/121 |
| 2001/0042342 A1* | 11/2001 | LaMear | ...................... | 47/66.1 |
| 2007/0180764 A1* | 8/2007 | Forman et al. | ................. | 47/33 |
| 2008/0241433 A1* | 10/2008 | Li | ............................... | 428/27 |
| 2009/0077880 A1* | 3/2009 | Kadosh | ..................... | 47/66.7 |

FOREIGN PATENT DOCUMENTS

DE 19723816 A1 * 12/1998
EP 301619 A1 * 2/1989
FR 2659192 A1 * 9/1991

* cited by examiner

*Primary Examiner*—Francis T Palo
(74) *Attorney, Agent, or Firm*—Edward Langer, Adv.; Law Offices of Edward Langer

(57) ABSTRACT

A method for planting a living fence of different lengths with a height or design which varies, from saplings of different species. The fence can be transported ready for planting in an intended location, with the transport device provided as an integral part of the growth apparatus, and with the transport device intended to protect the fence from damage during transport.

15 Claims, 2 Drawing Sheets

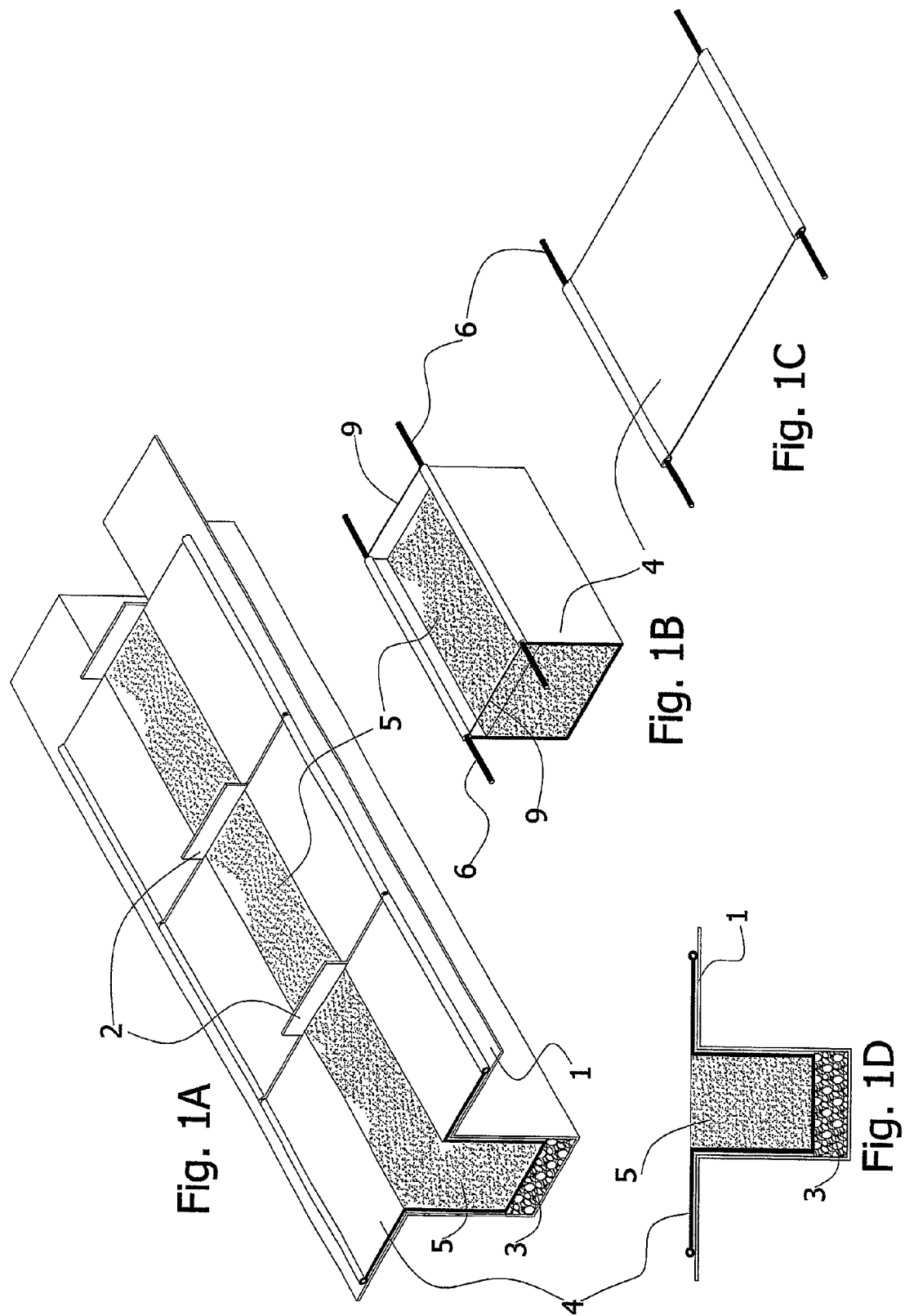

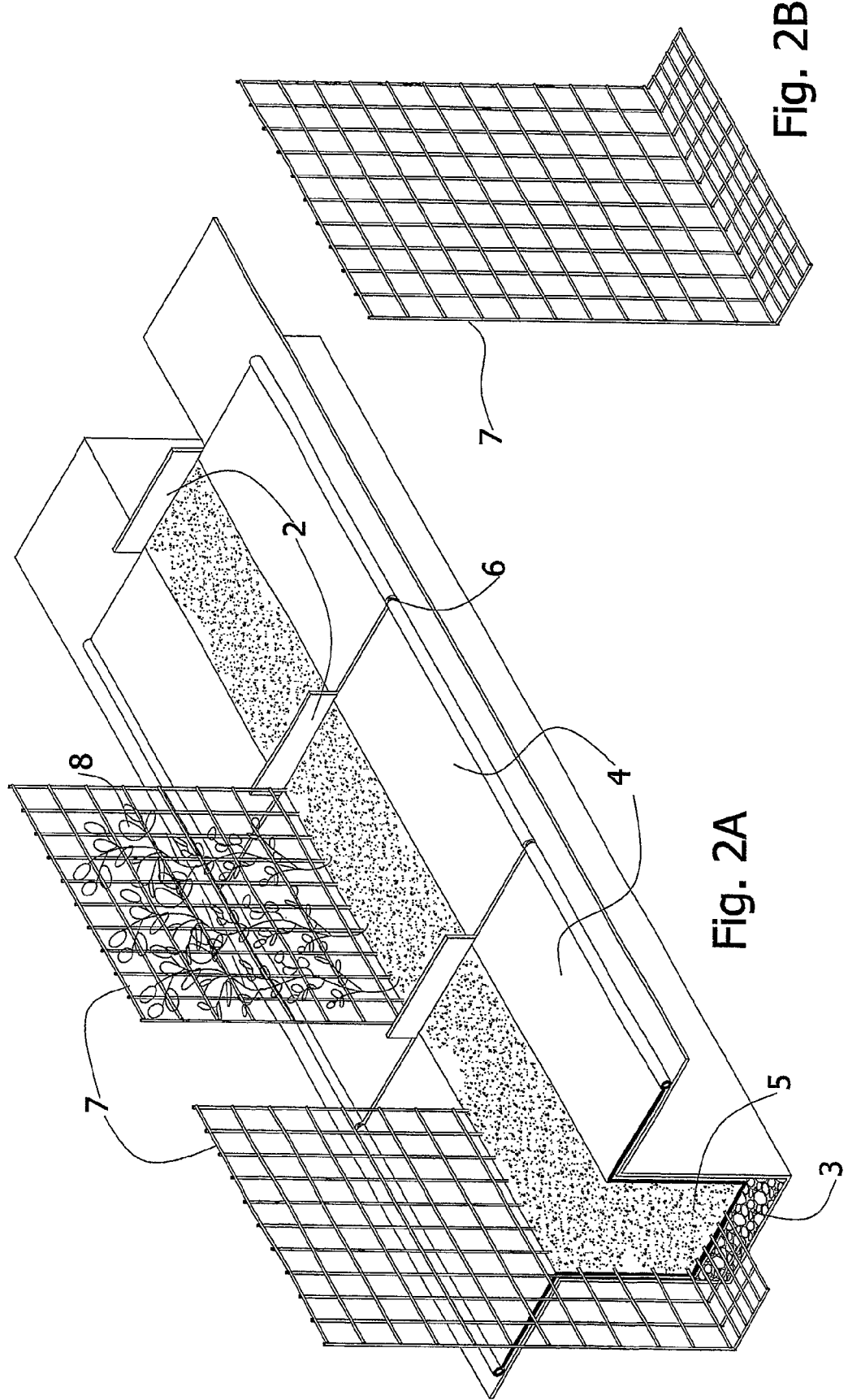

METHOD FOR PLANTING AND TRANSPORTING PRE-GROWN HEDGES TO PROVIDE AN INSTANT FENCE

FIELD OF THE INVENTION

The present invention relates to a method for growing and transporting a developed hedge of different varieties and lengths, designed and ready for planting. According to the invention, saplings are grown for transportation as a pre-grown, ready living hedge, which can be planted in ready fashion in an intended location, to obtain an instant living fence.

BACKGROUND OF THE INVENTION

Today, when someone wants to build a fence which can divide or define between different areas, with any kind of designed shape, he plants a sapling which he has chosen from a particular species, in accordance with recommendations of a garden nursery, and he grows a hedge. When the bush is grown (in accordance with the growth rate of the sapling chosen), the bush can be designed as a hedge providing a living fence. This activity generally takes a long time, between several months and years.

In public and private parks, sometimes there is a need to erect an instant living fence, either per a specific order, or other need.

Today, there is no answer for a way to instantly construct, transport and plant a living fence of a desired length, designed with different heights and of different types, in accordance with a customer's designs or requirements.

The invention provides a solution for planting of a living fence of different lengths with a height or design which varies, from saplings of different species. The fence can be transported ready for planting in an intended location, with the transport device provided as an integral part of the growth apparatus, and with the transport device intended to protect the fence from damage during transport.

SUMMARY OF THE INVENTION

The invention is based on the growth of saplings within growth channels placed in a trench formed in the ground or above it or on growth tables, located in an open area or in a greenhouse. The growth channels have varying lengths and are covered with perforated plastic or water-permeable sheets (herein: the envelope). The envelope serves as a separation device between the ground and the growth apparatus including pebbles, separation barrier, transportable growth sheets, growth soil and saplings.

The transportable growth sheets, serve as the "flower pot" within which the growth soil is located, into which the saplings are planted, which become the living fence once grown. The sheets and the growth soil within them are separated by a barrier in order to keep the roots under control. The transportable growth sheets may be perforated, or formed of PVC or other plastic material, or as woven fibers.

The sheets are designed so that they serve as a carrier and support the growth soil and the saplings that grow in it, which constitute the living fence, without becoming damaged during transportation. The transportation is achieved via rods placed along the length of sleeves or rings formed along the length of the sheets, which support it like a stretcher.

Between the envelope and the growth sheets there is a ventilated section, comprised of gravel, volcanic rock or plastic which creates a ventilated separation barrier which does not retain water, and which prevents the development of roots outside of the transportable growth sheets, thereby simplifying their removal from the growth channels, and allowing placement of the transportable growth sheets within the envelope for new planting.

The saplings within the growth soil contained within the growth sheets receives water from a droplet or spray system.

The excess irrigation water drips through the perforations in the growth sheets or via the sheets themselves, (depending on the degree of closeness), passes the separation barrier comprised of volcanic rock, gravel or any other material, and continues through the holes in the envelope, to the ground, or other drainage system.

The purpose of the ventilated separation barrier is to prevent the sapling roots from developing outside of the growth sheets since they are stopped by the ventilated section which does not contain water, thus preventing the roots from spreading outside of the growth sheets.

When the saplings have grown and during their growth were shaped to be a living fence or a continuous sapling, when they are ordered by purchaser, the rods can be placed in the sleeves or rings prepared on the sides of the transportable growth sheets and they will be removed from the envelope together with the growth soil. The saplings are then transported to the new planting location while they are carried by the rods to guarantee their completeness.

A living fence from climbing plants can be grown by inserting screens having a desired height within the growth sheets, with a lower portion of the screen being bent so as to be inserted within the growth channel width, and supported by the growth soil in which the climbing plants are planted.

At the time of transportation, the carriers are transported by use of the rods inserted within them, and are transported together with the screen platforms.

BRIEF DESCRIPTION OF THE DRAWINGS

For a better understanding of the invention, reference is made to the following drawings:

FIG. 1a is a general perspective view of the invention including all of the elements comprising the growth channel envelope, the ventilated section, the growth sheets with the transportation apparatus (FIG. 1b), with the transportable growth sheets being independent and provided with carrying rods (FIG. 1c), and FIG. 1d is a front view of the invention.

FIG. 2a is a perspective view of an alternative embodiment in which the growth sheets have placed therein a support screen (FIG. 2b) for climbing plants of different heights, in order to enable growth of plants as a living fence, where the plants require support to provide a fence.

DETAILED DESCRIPTION OF THE INVENTION AND METHOD

Referring to FIGS. 1a and 1d, there are shown perspective and front views of the elements of the invention for implementing a method of growing a hedge in accordance with the invention, including a separation layer (1) which is permeable or perforated for removal of excess irrigation water, and which extends the entire length of the growth channel. The growth channel is divided into units of length by partitions (2) which extend the entire depth of the growth channel until the ventilated separation barrier (3), which is made of gravel or volcanic rock or any other non-absorptive material which is designed to develop a ventilated area and to prevent growth of roots under the transportable growth sheets (4), in which the growth soil (5) is established for the saplings.

The transportable growth sheets (FIGS. 1b-c) which are permeable to water have a varying length, and have a continuous sleeve formed along the length, or rings attached thereto, for placement of the carrying rods (6) so as to enable transportation of the saplings together with the soil as one unit. A device such as cords (9) can be used to keep the box-like shape of the unit.

In FIGS. 2a-b, an alternative embodiment is shown which is intended for climbing plants so that the growth ladder (7) is integrated within the transportable growth sheets (4), which are divided into units by the partitions (2). The plants (8) are planted within the growth soil (5) and they climb on the growth ladder (7), and during transportation, the entire construction of the climbing ladder (7) together with the soil (5) and the growth sheets (5) is transportable as one unit using the carrying rods, to the location for planting.

Having described the invention with regard to certain specific embodiments thereof, it is to be understood that the description is not meant to be a limitation, since further modifications will now become apparent to those skilled in the art, and it is intended to cover such modifications which fall within the scope of the appended claims.

The invention claimed is:

1. A method for growing and transporting a living fence shaped and prepared for planting, comprising at least one of saplings and climbing plants, said method comprising
    constructing a system comprising:
        an external sheet providing a growth channel formed within and separated from the soil, said sheet providing a separation layer, and being formed so as to enable passage of excess irrigation water
        a transportable, internal growth sheet placed within said external sheet and separated therefrom by non-absorbing material providing a ventilation layer between said internal and external sheets,
        said growth sheet having formed at either end along its entire length a connection means enabling insertion therein of carrying rods for lifting and transporting said growth sheet,
        said transportable growth sheet being formed to enable passage of excess irrigation water,
        said transportable growth sheet containing growth soil in which said plants are planted for growth;
    planting saplings within said transportable growth sheet and growing them into a living hedge; and
    lifting said transportable growth sheet as one unit from said growth channel while containing said living hedge therein, for re-planting said hedge as a living fence.

2. The method of claim 1 wherein said hedge growth system further comprises partitions placed within said growth channel to define a length of said unit, and prevent roots from growing between units.

3. The method of claim 1 wherein said living fence comprises climbing plants, and said growth soil has buried within it a screen having horizontal and vertical sections, said horizontal section being buried under said growth soil, with said vertical section extending vertically therefrom for supporting said climbing plants.

4. The method of claim 1 wherein said one unit in said lifting step comprises said growth sheet, said growth soil, and said living hedge.

5. The method of claim 3 wherein said one unit in said lifting step comprises said growth sheet, said growth soil, said climbing plants and said supporting screen.

6. The method of claim 1 wherein said growth channel is placed within a trench formed within the ground.

7. The method of claim 1 wherein said transportable growth sheet is formed with perforations.

8. The method of claim 1 wherein said transportable growth sheet is formed from PVC other plastic material.

9. The method of claim 1 wherein said transportable growth sheet is formed of woven fibers.

10. The method of claim 1 wherein said non-absorptive material comprises non-absorptive gravel.

11. The method of claim 1 wherein said connection means comprises a sleeve formed on edges of said growth sheet, for placement of rods therein along the length thereof, enabling it to be lifted for re-planting said hedge as a living fence.

12. The method of claim 1 wherein said connection means comprises rings attached on edges of said growth sheet, for placement of rods therethrough along the length thereof, enabling it to be lifted for re-planting said hedge as a living fence.

13. The method of claim 1 wherein said one unit is provided with closing means enabling it to maintain a box-like shape.

14. A system for growing and transporting a living fence shaped and prepared for planting, comprising at least one of saplings and climbing plants, said system comprising:
    an external sheet providing a growth channel formed within and separated from the soil, said sheet providing a separation layer, and being formed so as to enable passage of excess irrigation water, and
    a transportable, internal growth sheet placed within said external sheet and separated therefrom by non-absorptive material, providing a ventilation layer between said internal and external sheets,
    wherein said growth sheet has formed at either end along its entire length a connection means enabling insertion therein of carrying rods for lifting and transporting said growth sheet,
    wherein said transportable growth sheet is formed to enable passage of excess irrigation water,
    wherein said transportable growth sheet contains growth soil in which said plant are planted for growth,
    such that when saplings are planted within said transportable growth sheet and grown into a living hedge,
    said transportable growth sheet can be lifted as one unit from said growth channel while containing said living hedge therein, for re-planting said hedge as a living fence.

15. The system of claim 14 wherein said one unit is provided with closing means enabling it to maintain a box-like shape.

* * * * *